United States Patent
Weissman

(10) Patent No.: US 8,549,000 B2
(45) Date of Patent: Oct. 1, 2013

(54) METHODS AND SYSTEMS FOR COMPRESSING INDICES

(75) Inventor: Adam J. Weissman, Federal Way, WA (US)

(73) Assignee: Google Inc., Mountain View, CA (US)

(*) Notice: Subject to any disclaimer, the term of this patent is extended or adjusted under 35 U.S.C. 154(b) by 136 days.

(21) Appl. No.: 13/295,286

(22) Filed: Nov. 14, 2011

(65) Prior Publication Data

US 2012/0059828 A1    Mar. 8, 2012

Related U.S. Application Data

(63) Continuation of application No. 12/886,000, filed on Sep. 20, 2010, now Pat. No. 8,060,516, which is a continuation of application No. 10/748,505, filed on Dec. 30, 2003, now Pat. No. 7,801,898.

(51) Int. Cl.
G06F 17/30 (2006.01)
G06F 7/00 (2006.01)

(52) U.S. Cl.
USPC .......... 707/736; 707/711; 707/723; 707/742; 707/748

(58) Field of Classification Search
None
See application file for complete search history.

(56) References Cited

U.S. PATENT DOCUMENTS

| 5,745,898 | A | | 4/1998 | Burrows |
| 5,765,158 | A | * | 6/1998 | Burrows ............................... 1/1 |
| 5,765,168 | A | | 6/1998 | Burrows |
| 5,826,261 | A | | 10/1998 | Spencer |
| 5,915,249 | A | * | 6/1999 | Spencer ........................ 707/742 |
| 6,584,458 | B1 | * | 6/2003 | Millett et al. ......................... 1/1 |
| 6,834,290 | B1 | * | 12/2004 | Pugh et al. .................... 707/803 |
| 6,847,966 | B1 | | 1/2005 | Sommer et al. |
| 7,266,553 | B1 | * | 9/2007 | Anderson et al. ...................... 1/1 |
| 7,356,527 | B2 | | 4/2008 | Carmel et al. |
| 7,419,748 | B1 | | 9/2008 | Ahn |
| 7,487,141 | B1 | | 2/2009 | Stephan |
| 2003/0088715 | A1 | * | 5/2003 | Chaudhuri et al. ........... 709/330 |
| 2003/0144995 | A1 | * | 7/2003 | Franz et al. ........................ 707/3 |

OTHER PUBLICATIONS

Dirk Bahle, Efficient Phrase Querying, Mar. 2003, School of Computer Science and Information Technology, Royal Melbourne Institute of Technology.
Michael Persin, Document Filtering for Fast Ranking, 1994, In Proceedings of SIGIR, pp. 339-348.

* cited by examiner

*Primary Examiner* — Sangwoo Ahn
(74) *Attorney, Agent, or Firm* — Middleton Reutlinger

(57) ABSTRACT

Systems and methods for compressing indices are described. In one aspect, a plurality of items are selected where each item has an entry in an inverted index and each item entry comprises a listing of articles that the item appears in. At least a first item entry and a second item entry are determined for compression and the second item entry is compressed into the first item entry resulting in a compressed first item entry.

20 Claims, 3 Drawing Sheets

METHODS AND SYSTEMS FOR COMPRESSING INDICES

CROSS-REFERENCE TO RELATED APPLICATIONS

This application is a continuation of and claims priority to U.S. patent application Ser. No. 12/886,000, filed on Sep. 20, 2010, which is a continuation of and claims priority to U.S. patent application Ser. No. 10/748,505, filed on Dec. 30, 2003, the contents of both of which are incorporated herein by reference.

FIELD OF THE INVENTION

The invention generally relates to indices. More particularly, the invention relates to methods and systems for compressing indices.

BACKGROUND OF THE INVENTION

A variety of mechanisms exist for searching vast numbers of documents, such as those available on the World Wide Web or large enterprise systems. A search engine or search engine program is a widely used mechanism for allowing users to search for information in vast numbers of documents. Typically, a search engine provides a user interface that includes a query field. In response to a query, for example, one or more keywords describing desired information, the user enters into the query field, the search engine attempts to locate, rank, sort and then return for display search results. The search results can be a list of ranked documents that includes for each document a link to the document and an excerpt of text meant to summarize the document.

In order to locate, rank, sort and return results in response to a user's query the search engine typically has previously indexed the documents and the items, such as, words, concepts, and images, contained in the documents so that these items can be matched to a user's query. Typically an index is created having an entry for each document and each entry containing the items appearing in the document. This index, sometimes referred to as a forward index, does not provide an easily searchable index for items. Therefore, an inverted index is usually created based on the forward index. An inverted index is indexed by items and for each item contains the documents that the item appears in.

Search engines typically take a user's query and parse it into words and then match the words with the words contained in an inverted index. Some search engines convert the words into concepts and match the concepts to previously determined concepts contained in an inverted index. The inverted index provides the search engine with the documents that the words or concepts appear in. The search engine then can further process these documents to rank them and decide whether to return them in a search result list to the user.

With the growing information on the world wide web and in enterprise network systems, inverted indices are becoming extremely large. The large size of inverted indices takes up a great deal of memory space. Therefore, there is a need for methods and systems for compressing an inverted index that overcomes the drawbacks of inverted indices used in the conventional search engines as described above.

SUMMARY

Embodiments of the present invention comprise methods and systems for detecting and extracting information from articles. One aspect of an embodiment of the present invention comprises selecting a plurality of items, each item having an entry in an inverted index, each item entry comprising a listing of articles that the item appears in, determining at least a first item entry and a second item entry for compression, and compressing the second item entry into the first item entry resulting in a compressed first item entry. Additional aspects of the present invention are directed to computer systems and to computer-readable media having features relating to the foregoing aspects.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for compressing indices. Reference will now be made in detail to exemplary embodiments of the invention as illustrated in the text and accompanying drawings. The same reference numbers are used throughout the drawings and the following description to refer to the same or like parts.

Figure 1:
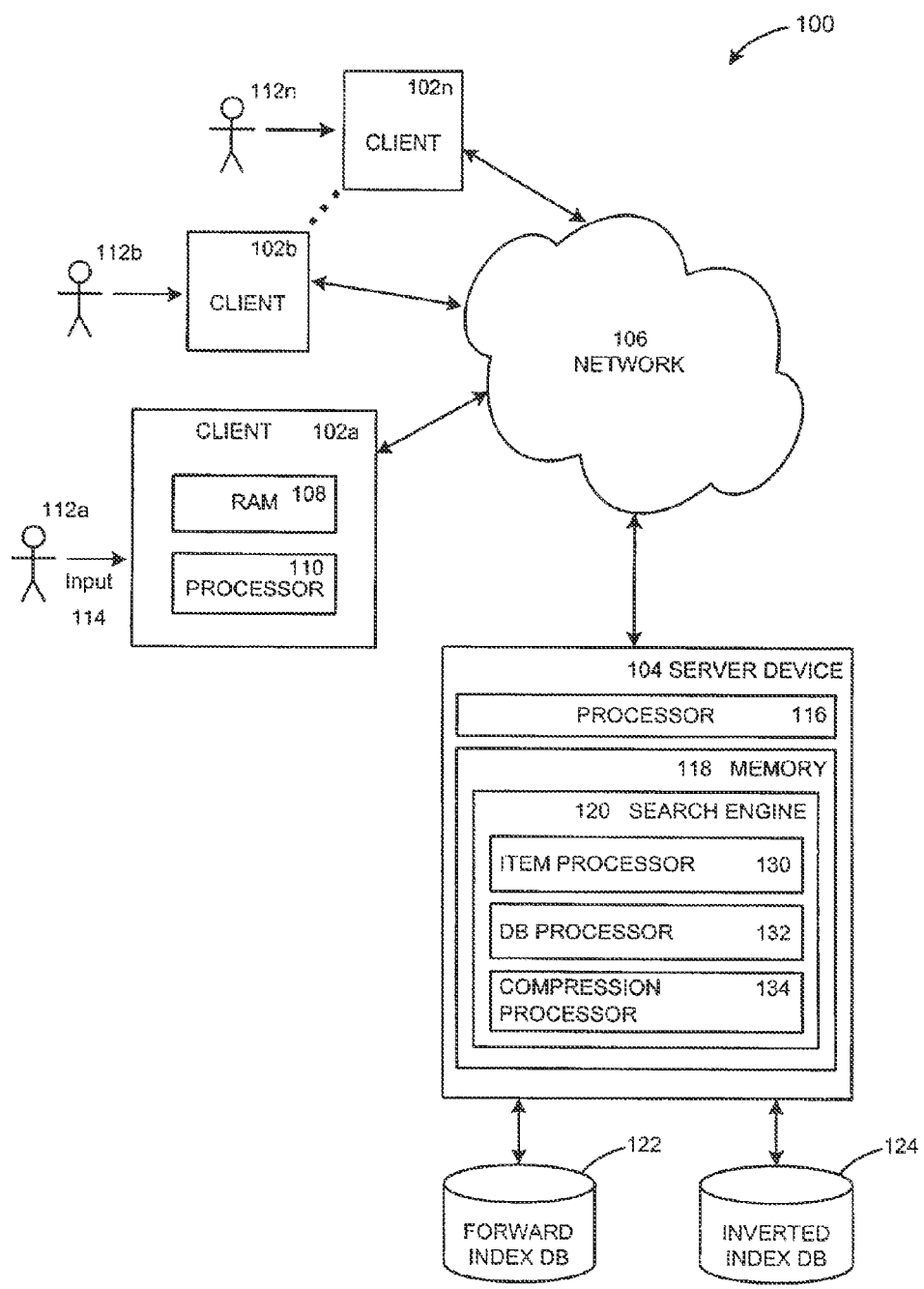
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, a server device 104 and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108, in the embodiment shown coupled to a processor 110. The processor 110 executes a set of computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a user interface application program and/or a browser application program such as Internet Explorer™, version 6.0 from Microsoft Corporation, Netscape Navigator™, version 7.1 from Netscape Communications Corporation, and Safari™, version 1.0 from Apple Computer. Through the client devices 102a-n, users 112a-n can communicate over the network 106 with each other and with other systems and devices coupled to the network 106.

As shown in FIG. 1, server device 104 is also coupled to the network 106. The server device 104 shown includes a server executing a search engine program. The system 100 can also include multiple other server devices. Similar to the client devices 102a-n, the server device 104 shown includes a processor 116 coupled to a computer readable memory 118. The server device 104 is depicted as a single computer system, but may be implemented as a network of computer processors. Examples of server device 104 are servers, mainframe computers, networked computers, a processor-based device and similar types of systems and devices. Client processors 110 and server processor 116 can be any of a number of well known computer processors, such as processors from Intel Corporation of Santa Clara, Calif. and Motorola Corporation of Schaumburg, Ill.

Memory 118 of the server device 104 contains a search engine application program, also known as a search engine 120. The search engine 120 can receive queries from users 112 through the network 106 and in response to a query can search for, sort, rank and return a list of articles to a user 112. Articles include, documents, for example, web pages of various formats, such as HTML, XML, XHTML, Portable Document Format (PDF) files, and word processor, database, and application program document files, audio, video, or any other information of any type whatsoever made available on a network (such as the Internet or intranet), a personal computer, or other computing or storage means. The embodiments described herein are described generally in relation to documents, but embodiments may operate on any type of article.

Typically, prior to receiving a query from a user 112, the search engine 120 crawls the available documents, for example, web pages on the web, and generates a forward index of the crawled documents. The forward index can include for each document entry the items that appear in the document, such as, for example, words, concepts, and images. The embodiments described herein are described generally in relation to concepts, but may operate on any type of item found in a document. In order to increase the speed of responsiveness to users' 112 queries, the search engine 120 can generate an inverted index from the forward index. The inverted index is an index of the items, such as, concepts, and includes for each concept entry a list of documents that the concept is contained in.

Server device 104 also provides access to other storage elements, such as a forward index storage element, in the example shown a forward index database 122, and a inverted index storage element, in the example shown a inverted index database 124. The forward index database 122 can be used to store the forward index generated by the search engine 120. The inverted index database 124 can be used to store the inverted index generated by the search engine 120. Data storage elements may include any one or combination of methods for storing data, including without limitation, arrays, hash tables, lists, and pairs. Other similar types of data storage devices can be accessed by the server device 104.

An example of a forward index is shown below in Table 1. Table 1 shows an example forward index having an entry for five documents D1 through D5. Each document entry includes a list of concepts found in the document as well as a concept value for each concept. The document entries can include pointers to the concepts contained in the documents. As shown in Table 1, the concept value can be a representation of the strength of the particular concept in the document in relation to other concepts contained in the document. In the example shown, C1 in D1 has a strength value of 0.5, which can mean that D1 is 50% about C1. Forward indices are typically a lot larger than the example shown and other information can be included in a forward index. In another embodiment, concept value can be a representation of whether a concept appears in a document or not.

TABLE 1

| D1 | C1: 0.5 | C2: 0.25 | C3: 0.25 |
| D2 | C1: 0.2 | C2: 0.6 | C4: 0.2 |
| D3 | C1: 0.5 | C2: 0.5 | |
| D4 | C1: 1.0 | | |
| D5 | C2: 0.2 | C3: 0.8 | |

An example of an inverted index based on the example forward index of Table 1 is shown below in Table 2. Table 2 shows an example inverted index with entries for concepts C1 through C4. Each concept entry includes the documents that the concept appears in as well as the concept value for each document. For example, a concept entry can include pointers to the documents that it appears in. As is known to those skilled in the art, inverted indices are typically a lot larger than the example shown and other information can be included in an inverted index.

TABLE 2

| C1 | D1: 0.5 | D2: 0.2 | D3: 0.5 | D4: 1.0 | |
| C2 | D1: 0.25 | D2: 0.6 | D3: 0.5 | | D5: 0.2 |
| C3 | D1: 0.25 | | | | D5: 0.8 |
| C4 | | D2: 0.2 | | | |

The search engine 120 shown includes an item processor 130, a database processor 132, and a compression processor 134. In the embodiment shown, each comprises computer code residing in the memory 118. The item processor 130 can locate and access concept entries in the inverted index database 124. In one embodiment, the item processor 130 can also select concept entries for further processing based on the relationships between the concepts. The compression processor 134 can determine which of the selected concept pairs are compressible. The database processor 132 compresses the compressible concept entries and replaces the concept entries with compressed entries.

It should be noted that the present invention may comprise systems having different architecture than that which is shown in FIG. 1. For example, in some systems according to the present invention, the compression processor 134 may not be part of the search engine 120, and may carry out its operations offline. The system 100 shown in FIG. 1 is merely exemplary, and is used to explain the exemplary method shown in FIG. 2.

Various methods in accordance with the present invention may be carried out. One exemplary method according to the present invention comprises first selecting a plurality of items, where each item has an entry in an inverted index and each item entry comprises a listing of articles that the item appears in. The item entry can also comprise an item value for each article that the item appears in. The item value can be a representation of the strength of the item in the article or can be a representation of whether the item appears in the article. Next, at least a first item entry and a second item entry are determined as candidates for compression. This can be determined by determining a cost-benefit ratio for compressing the second item entry into the first item entry and comparing the cost-benefit ratio with an acceptable value to determine if the cost-benefit ratio is acceptable. In one embodiment, the acceptable value is predetermined. Then, the second item entry can be compressed into the first item entry resulting in a compressed first item entry if the cost-benefit ratio is acceptable. The item values for the compressed first item entry can be determined by averaging the item values for the first and second entries for each article that the first or second items appear in. More than two item entries can be selected and compressed into a single item entry.

A cost for a cost-benefit ratio can be a representation of the loss in precision that may be caused by compressing the entries or the additional processing time that can be required when utilizing a compressed entry. The additional processing time can be required to compensate for the loss in precision caused by utilizing a compressed entry. In one embodiment, a cost can comprise a determination of how much the first item entry and the second item entry have to change when the second item entry is compressed into the first item entry. In one embodiment, a cost for the cost-benefit ratio is determined by adding together the item values for articles containing the first item and not the second item, the item values for articles containing the second item and not the first item, and the average of the difference between the item values for articles containing the first and second items. A benefit for the cost-benefit ratio can be a representation of the amount of memory saved if the first and second item entries were compressed. The items can comprise words, concepts or images.

Figure 2:
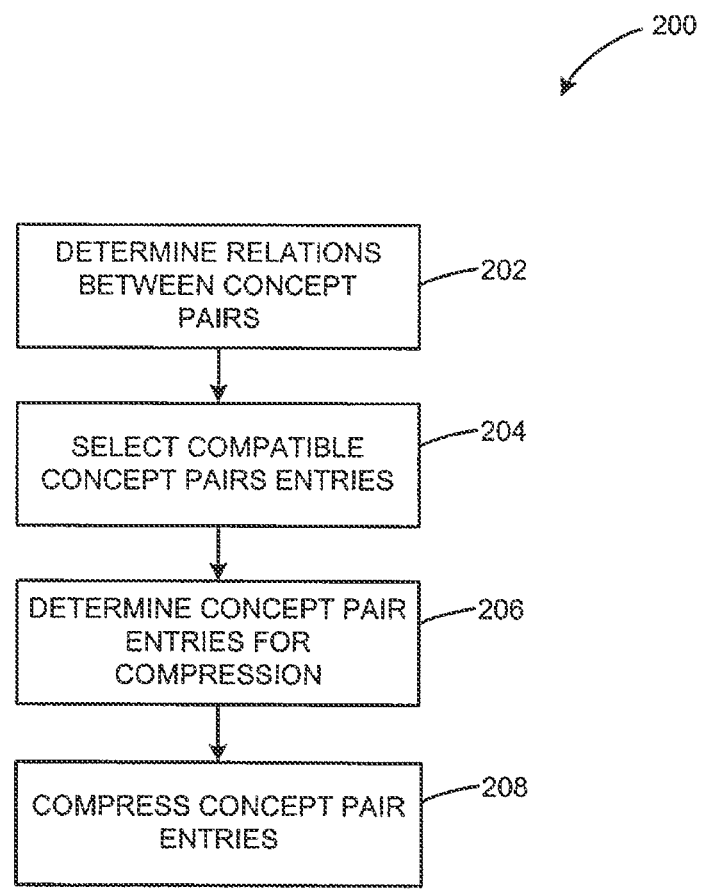
FIG. 2 illustrates a flow diagram of a method in accordance with one embodiment of the present invention.

FIG. 2 illustrates an exemplary method 200 in accordance with the present invention in detail. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2. The method 200 shown provides a method for compressing an index. While the method 200 is generally described in relation to compressing two entries in an index, the method is applicable to compressing more than two entries in an index into a single entry.

Each block shown in FIG. 2 represents one or more steps carried out in the exemplary method 200. Method 200 begins by determining relations between concepts in 202. In one embodiment, relations between concepts can be predetermined. This embodiment can include, for example, a semantic network that stores the relationships between concepts and the strength of relationships between concepts. The search engine 120 can access the semantic network to determine relations between concepts. The semantic network can be stored in a database and connected to the search engine 120 or can be accessed by the search engine 120 by, for example, the network 106. Alternatively, relationships can be manually determined where two concepts are known to relate to each other. In one embodiment, where the inverted index is an index of words, relationships between words may be predetermined and stored in a lexicon or otherwise known and stored by the system. Alternatively, words that have known relations to other words can be manually determined.

In 204, concepts are selected. In the embodiment shown, pairs of concepts are selected, but more than two concepts can be selected and compressed together. A close relationship is desired, so as to minimize the difference between the entries for the concepts. If the concepts have a close relationship, then it may be likely that the concepts will appear in the same documents making the compressed entry closer to the uncompressed entries. In one embodiment, the concept pairs can be selected automatically by the item processor 130 using relationship strength values between concepts and a predetermined relationship strength value threshold. Alternatively, the concept pairs with close relationships may be selected manually based on known relationships between concepts. In both embodiments, the item processor 130 can locate and access the concept entry pairs in the inverted index database 124, for example. In another embodiment, the item processor can randomly select concepts.

Next, in 206, for each selected pair of concept entries, the compression processor 134 determines whether the pair of concept entries can be compressed. This can be determined in a variety of ways. In one embodiment, this can be done by determining a cost-benefit ratio for each selected pair of concept entries and comparing the determined cost-benefit ratio to a predetermined acceptable value to determine if the cost-benefit ratio is acceptable. In such embodiment, if the cost-benefit ratio is less than the acceptable value, the pair of concept entries can be determined to be a compressible pair. The cost is the cost of compressing the entries together and can be a representation of how much each entry has to change to allow the compression of the entries. The benefit is the increase in speed of the search and the saved memory and can be a representation of the amount of memory saved. The cost-benefit ratio can be determined in a variety of ways.

Figure 3:
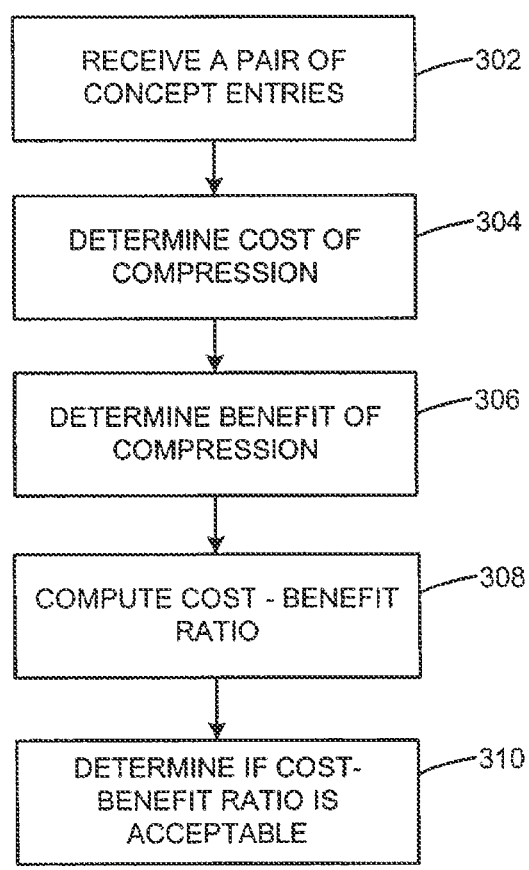
FIG. 3 illustrates a subroutine of the method shown in FIG. 2.

FIG. 3 illustrates an example of a subroutine 206 for carrying out the method 200 shown in FIG. 2. An example of subroutine 206 for one pair of concept entries is as follows. The subroutine 206 begins at 302, in which the compression processor 134 receives a pair of concept entries from the inverted index database 124 that have been located by the item locator 130.

In 304, the compression processor 134 determines the cost of compressing the two concept entries. The cost can represent the loss of precision by combining the two concepts or the additional processing time caused by utilizing a combined entry. For example, cost can be calculated by determining the sum of the difference of the concept values for the documents contained in the concept entries. For the example of C1 and C2 in Table 2, the cost is computed as follows. First, the concept value for C1 from D4, which is 1.0, because D4 does not contain C2, is included. Also included is the concept value for C2 in D5, which is 0.2, because C1 does not appear in D5. Next, the differences in concept values are added together for the documents where both C1 and C2 appear. For example, for D1, this is calculated by subtracting the concept value for C2 in D1, which is 0.25, from the concept value of C1 in D1, which is 0.5. Similar calculations are then made for D2 and D3. An example of the overall calculation for calculating the cost of compressing the entries for C1 and C2 from Table 2 is as follows:

$$\text{Cost} = (0.5 - 0.25) + (0.6 - 0.2) + (0.5 - 0.5) + 1.0 + 0.2$$

Thus, the cost of compressing the concept entries C1 and C2 is 1.85. Other ways of determining a cost can be used.

The compression processor 134 next determines a benefit of compressing entries for the pair of concepts in 306. The benefit can represent the memory savings, processing time savings, or other benefits of compressing the two entries. For example, the benefit can be the number of places of the two entries saved by compressing the pair of concepts minus any overhead required for the compressed entry. Referring again to concept entries C1 and C2 in Table 2, for example, if C2 is compressed into C1, the number of places in C2 that is saved is three, because the total number of entries for C1 and C2 is eight and the resulting compressed entry would have five entries (for D1-D5). By compressing C2 into C1, five entries are needed for the compressed entry. An overhead entry can be used to hold a pointer for C2, so the benefit can be two. Other ways of determining a benefit can by used.

In 308, the compression processor 134 computes the cost-benefit ratio for the pair of concept entries. The cost-benefit ratio can be the cost computed in step 304 divided by the benefit computed in step 306. In the example of C1 and C2 from Table 2, the cost-benefit ratio is computed by 1.85/2 which equals 0.925.

In 310, the compression processor 134 determines if the calculated cost-benefit ratio is acceptable to compress the pair of concept entries. In one embodiment, the cost-benefit ratio of the pair of concept entries is compared to a predetermined acceptable value. If the cost benefit ratio is lower than the acceptable value, then the pair of concept entries can be compressed. The acceptable value can be determined by using a number of sample sets of concept pair entries to create multiple cost benefit ratios, compressing pairs of concept entries from the sample sets to create compressed entries, and determining whether search result accuracy is effected by the compressed entries in the inverted index. The subroutine 206 as described in FIG. 3 can be performed on all of the selected concept pair entries from 204 to determine multiple pairs of concept entries that can be compressed.

Referring again to FIG. 2, in 208 the database processor 132 compresses the pairs of concept entries found acceptable in 206 to create compressed entries. This can be achieved by using the concept values for the concept pair in each document to determine new concept values for the compressed entry. For example, the average of the two concept values for each document can be used as the compressed concept value. For the example of C1 and C2 shown in Table 2, this can be determined by calculating the average of the concept values for C1 and C2 in D1 through D5. For example, the compressed concept values for the compressed entry $C1_{COMP}$ that is the result of C2 being compressed into C1 is shown in Table 3 below.

TABLE 3

| $C1_{COMP}$ | D1: 0.375 | D2: 0.4 | D3: 0.5 | D4: 0.5 | D5: 0.1 |
|---|---|---|---|---|---|
| C2 | Pointer to $C1_{COMP}$ | | | | |

Also as shown in Table 3, the entry for C2 includes a pointer to the compressed $C1_{COMP}$ entry so that when it is desired to search for C2, the entry for $C1_{COMP}$ is used. This can be done for all concept entries that are determined to be compressible. In one embodiment, when the concept values represent only whether the concept appears in the document or does not appear in the document, the compressed entry can be determined as described above or can be determined by making the concept values for the compressed entry indicate when either one of the concepts appear in a document.

A compressed entry is typically going to differ from each of the entries of its respective concept entries, resulting in a loss of precision if one or more compressed entries is utilized for identification of documents that are then provided to the user. Secondary processing of the documents after identification using one or more compressed entries can remove or reduce any loss of precision caused by the use of one or more compressed entries, resulting in increased processing time.

It should be noted that more than two entries can be compressed into a single compressed entry. For example, the concept entries from Table 2 above can be compressed into a single compressed entry in place of C1 and the remaining concept entries, C2-C4, can each include pointers to the compressed entry.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A data processing system comprising:
    memory storing an inverted index comprising a plurality of entries, wherein
    i) a first of the entries includes
        a plurality of document identifiers each identifying a document,
    ii) a second of the entries
        identifies at least one word, concept, or image and includes a pointer to the first of the entries, and
    iii) a third of the entries
        identifies at least one word, concept, or image that differs from the at least one word, concept, or image identified by the second of the entries and includes
        a pointer to the first of the entries,
        wherein the first entry is a combined entry related to the second of the entries and the third of the entries; and
    one or more data processors programmed to retrieve document identifiers that identify documents responsive to search queries, the retrieving including
    receiving a first search query to which the at least one word, concept, or image identified by the second of the entries is responsive,
    locating the second of the entries in the inverted index using the first search query,
    following the pointer in the second of the entries to the first of the entries,
    retrieving at least some of the plurality of document identifiers in the first of the entries for responding to the first search query,
    receiving a second search query to which the at least one word, concept, or image identified by the third the entries is responsive,
    locating the third of the entries in the inverted index using the second search query,
    following the pointer in the third of the entries to the first of the entries, and
    retrieving at least some of the plurality of document identifiers in the first of the entries for responding to the second search query.

2. The data processing system of claim 1, wherein the one or more data processors programmed to retrieve document identifiers comprises a search engine.

3. The data processing system of claim 2, further comprising:
a first remote client device programmed to submit the first search query; and
a second remote client device programmed to submit the second search query,
wherein the one or more data processors are programmed transmit the retrieved document identifiers for responding to the first search query to the first remote client device and retrieved document identifiers for responding to the second search query to the second remote client device.

4. The data processing system of claim 1, wherein:
the at least one word, concept, or image identified by the second of the entries is a first concept;
the at least one word, concept, or image identified by the third of the entries is a second concept; and
the first of the entries includes a plurality of values each representing an average strength of expression of the first concept and the second concept in a respective of the documents identified by plurality of document identifiers.

5. The data processing system of claim 1, wherein the retrieving of the document identifiers further comprises:
processing a document retrieved for responding to the second search query to determine a strength of expression of the at least one word, concept, or image responsive to the first search query in the processed document; and
ranking the processed document based at least in part on the determined strength of expression.

6. The data processing system of claim 1, wherein the one or more data processors are further programmed to perform operations including:
determining that a cost of compressing the second of the entries and the third of the entries is acceptable, and
in response to determining that the cost is acceptable, creating the combined entry in the inverted index.

7. A data processing system comprising:
memory storing an inverted index comprising a plurality of entries, wherein
i) a first of the entries includes
a plurality of document identifiers each identifying a document, and
ii) a second of the entries
identifies at least one word or concept and includes
a pointer to the first of the entries,
wherein the first of the entries is a combined entry related to the second of the entries and at least one additional of the entries; and
one or more data processors programmed to retrieve document identifiers that identify documents responsive to a search query, the retrieving including
receiving a search query to which the at least one word or concept identified by the second of the entries is responsive,
locating the second of the entries in the inverted index using the search query,
following the pointer in the second of the entries to the first of the entries and retrieving at least some of the plurality of document identifiers therefrom,
processing two or more of the documents identified by the retrieved document identifiers to determine a strength of expression of the at least one word or concept in each of the processed documents, and
ranking the processed documents based at least in part on the determined strengths of expression.

8. The data processing system of claim 7, wherein the one or more data processors programmed to retrieve document identifiers comprises a search engine.

9. The data processing system of claim 8, further comprising a remote client device programmed to submit the search query, wherein the one or more data processors are programmed transmit the ranking of the processed documents to the remote client device.

10. The data processing system of claim 7, wherein the at least one additional of the entries includes a third of the entries in the inverted index that:
identifies at least one word or concept that differs from the at least one word or concept, or image identified by the second of the entries; and
includes a pointer to the first of the entries.

11. The data processing system of claim 10, wherein the one or more data processors are further programmed to perform operations including:
determining that a cost of compressing the second of the entries and the third of the entries is acceptable, and
in response to determining that the cost is acceptable, creating the combined entry in the inverted index.

12. A data processing system comprising:
memory storing an inverted index comprising a plurality of entries, wherein
i) a first of the entries
identifies a first word or concept and
includes a plurality of document identifiers each identifying a respective document in which the word or concept identified by the first of the entries is expressed, and
ii) a second of the entries
identifies a second word or concept and
includes a plurality of document identifiers each identifying a respective document in which the word or concept identified by the second of the entries is expressed; and
one or more data processors programmed to perform operations including:
determining that a cost of compressing the first of the entries and the second of the entries is acceptable, and
in response to determining that the cost is acceptable, creating a combined entry in the inverted index, wherein the combined entry includes
at least one of the plurality of document identifiers in the first of the entries that is absent from the second of the entries.

13. The data processing system of claim 12, wherein the operations further comprise adding a pointer to the combined entry into the first of the entries.

14. The data processing system of claim 13, wherein the operations further comprise adding a pointer to the combined entry into the second of the entries.

15. The data processing system of claim 12, wherein the one or more data processors are further programmed to retrieve document identifiers that identify documents responsive to a search query, the retrieving including
receiving a search query to which the at least one word or concept identified by the second of the entries is responsive,
locating the first of the entries in the inverted index using the search query,
following the pointer in the first of the entries to the combined entry, and retrieving the at least one of the plurality of document identifiers therefrom.

16. The data processing system of claim 12, wherein the retrieving further comprises:
processing a document identified by the retrieved document identifier to determine a strength of expression of the first word or concept in the processed document; and
ranking the processed document based at least in part on the determined strength of expression.

17. The data processing system of claim 12, wherein the compressed index further comprises at least one of the plurality of document identifiers in the second of the entries that is absent from the first of the entries.

18. The data processing system of claim 12, wherein:
the first of the entries further comprises values each associated with a respective of the document identifiers and representing a strength of expression of the word or concept identified by the first of the entries in the document identified by the associated document identifier; and
the second of the entries further comprises values each associated with a respective of the document identifiers and representing a strength of expression of the word or concept identified by the second index in the document identified by the associated document identifier.

19. The data processing system of claim 18, wherein the combined entry further comprises values each associated with a respective of a plurality of document identifiers and representing an average strength of expression of the word or concept identified by the first of the entries and the word or concept identified by the second of the entries in the document identified by the associated document identifier.

20. The data processing system of claim 12, wherein determining that the cost of compressing is acceptable comprises determining a benefit of compressing the first of the entries and the second of the entries.

\* \* \* \* \*